United States Patent
Schalk et al.

(10) Patent No.: US 12,214,598 B2
(45) Date of Patent: Feb. 4, 2025

(54) FLUID EXTRACTION VIA REMOVABLE EXTRACTION RESERVOIRS

(71) Applicant: Hewlett-Packard Development Company, L.P., Spring, TX (US)

(72) Inventors: Wesley R Schalk, Vancouver, WA (US); Christopher John Arnold, Vancouver, WA (US); Jesse Sutherland, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 942 days.

(21) Appl. No.: 17/049,147

(22) PCT Filed: Jul. 13, 2018

(86) PCT No.: PCT/US2018/041965
§ 371 (c)(1),
(2) Date: Oct. 20, 2020

(87) PCT Pub. No.: WO2020/013841
PCT Pub. Date: Jan. 16, 2020

(65) Prior Publication Data
US 2021/0245521 A1    Aug. 12, 2021

(51) Int. Cl.
| | |
|---|---|
| B41J 2/175 | (2006.01) |
| B29C 64/307 | (2017.01) |
| B29C 64/386 | (2017.01) |
| B33Y 40/00 | (2020.01) |
| B33Y 50/00 | (2015.01) |

(52) U.S. Cl.
CPC ......... *B41J 2/17566* (2013.01); *B29C 64/307* (2017.08); *B29C 64/386* (2017.08); *B33Y 40/00* (2014.12); *B33Y 50/00* (2014.12)

(58) Field of Classification Search
CPC ... B41J 2/17566; B29C 64/307; B29C 64/386
See application file for complete search history.

(56) References Cited

U.S. PATENT DOCUMENTS

| | | | |
|---|---|---|---|
| 5,860,363 | A | 1/1999 | Childers |
| 6,033,064 | A | 3/2000 | Pawlowski, Jr. et al. |
| 6,206,511 | B1 | 3/2001 | Cook et al. |
| 6,481,837 | B1 | 11/2002 | Askren et al. |

(Continued)

FOREIGN PATENT DOCUMENTS

| | | |
|---|---|---|
| EP | 1060081 A1 | 12/2000 |
| EP | 2692530 A1 | 2/2014 |

(Continued)

*Primary Examiner* — Paul J Gray
(74) *Attorney, Agent, or Firm* — Brooks, Cameron & Huebsch, PLLC

(57) ABSTRACT

In one example in accordance with the present disclosure, a fluid extraction system is described. The fluid extraction system includes an interface to fluidically and electrically couple a removable extraction reservoir to a printing device. The removable extraction reservoir is to receive an amount of fluid from a reservoir in the printing device. The system also includes a controller to, based on data received from memory of an interfaced removable extraction reservoir, initiate an extraction operation wherein fluid from the reservoir is passed to the removable extraction reservoir.

14 Claims, 8 Drawing Sheets

(56) References Cited

U.S. PATENT DOCUMENTS

| | | |
|---|---|---|
| 7,311,389 B1 | 12/2007 | Pidgeon |
| 7,506,973 B2 | 3/2009 | Steinmetz et al. |
| 7,794,070 B2 | 9/2010 | Silverbrook |
| 7,901,063 B2 | 3/2011 | Wouters et al. |
| 2005/0088322 A1 | 4/2005 | Silverbrook |
| 2008/0055378 A1 | 3/2008 | Drury et al. |
| 2008/0230730 A1 | 9/2008 | Brown |
| 2011/0102847 A1 | 5/2011 | Wang |
| 2021/0245522 A1* | 8/2021 | Arnold ................. B41J 2/18 |

FOREIGN PATENT DOCUMENTS

| | | |
|---|---|---|
| JP | 10202900 | 8/1998 |
| JP | 2005518526 | 6/2005 |
| JP | 2018134834 | 8/2018 |
| WO | 99/44830 A1 | 9/1999 |
| WO | WO-2017073074 | 5/2017 |

* cited by examiner

FLUID EXTRACTION VIA REMOVABLE EXTRACTION RESERVOIRS

BACKGROUND

Printing devices operate to dispense a fluid onto a substrate surface. For example, a printer may operate to dispense fluid such as ink onto a surface such as paper in a predetermined pattern. In another example, an additive manufacturing fluid is dispensed as part of an additive manufacturing operation. The fluid is supplied to such printing devices from a reservoir or other supply. That is, a reservoir holds a volume of fluid that is passed to the printing device and ultimately deposited on a surface.

BRIEF DESCRIPTION OF THE DRAWINGS

The accompanying drawings illustrate various examples of the principles described herein and are part of the specification. The illustrated examples are provided for illustration, and do not limit the scope of the claims.

Figure 1:
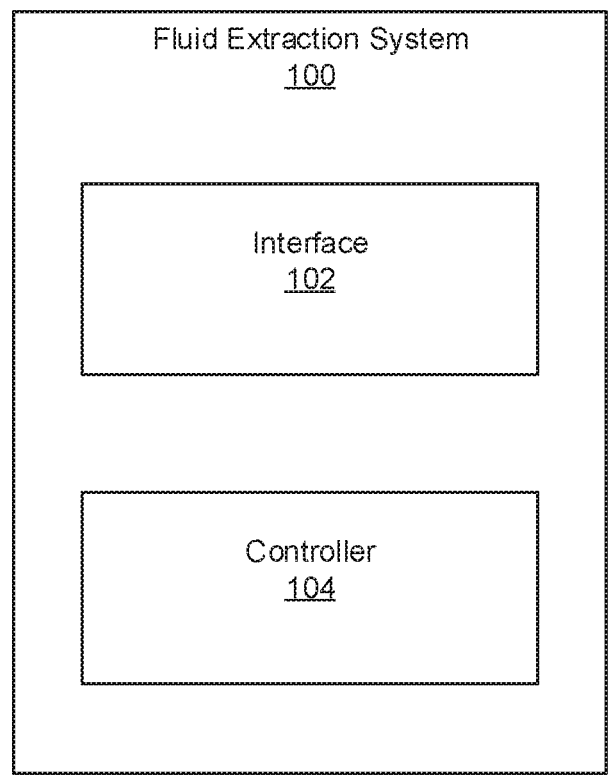
FIG. 1 is a block diagram of a fluid extraction system for extracting fluid to a removable extraction reservoir, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As described above, fluid such as ink in a printer and or additive manufacturing liquid in a 3D printer, is deposited on a surface from a printing device. Fluid is supplied via a reservoir that holds the fluid to be ejected. In some examples, e.g., a continuous fluid system, a reservoir is internal to the printer. Over time as the fluid is depleted from the reservoir it may be refilled or topped off.

While such printers with continuous fluid systems may be beneficial, certain situations could benefit from additional operation. In some cases, for example, printing devices with continuous fluid systems may be used under a contract in which the print fluid, such as ink, is supplied under terms of the contract. However, if a printing device reaches an end of contract date with fluid still remaining in the reservoir, a fluid supplier may wish to extract the fluid from the reservoir. For example, in cases in which the printing device is to be returned to the supplier at the end of the contract, the fluid supplier may have an interest in extracting fluid from the reservoir prior to the printing device being returned to the printing device supplier, such as to avoid potential fluid spills. In cases in which the device has been purchased by the end user, the fluid supplier may have an interest in extracting fluid from the reservoir at the end of the contract, such as to avoid having the end user use contractual fluid without payment and/or while not under contract. In another example, the printing device may have a malfunction which is too costly to repair such that the printing device is to be removed from operation. In this example the fluid supplier again may wish to extract the fluid from the reservoir prior to disposal of the printing device.

Other examples of when it may be desirable to remove fluid such as ink from a reservoir include long term storage of the printing device and/or transportation of the printing device. In either scenario, leaving the ink in the reservoir may be undesirable as pigments may settle and cause blockage in a delivery system, the ink may dry out during long term storage, and/or the ink may spill during the jostling that generally accompanies transportation.

As yet another example, it may be desirable to remove ink from a reservoir during a service, repair, and/or replacement event of that particular reservoir, another reservoir, or a module in which the reservoirs are disposed.

Accordingly, the present specification describes a fluid extraction operation wherein fluid in a reservoir can be extracted in a secure fashion while maintaining the integrity of the fluid disposed therein. That is, the fluid is not exposed to environmental contamination and can be recycled for use in other printing devices.

Specifically, the present specification describes a fluid extraction system. The system includes an interface to fluidically and electrically couple a removable extraction reservoir to a printing device. The removable extraction reservoir is to receive an amount of fluid from a reservoir in the printing device. The system also includes a controller to, based on data received from memory of an interfaced removable extraction reservoir, initiate an extraction operation wherein fluid from the reservoir is passed to the removable extraction reservoir.

The present specification also describes a fluid transportation system. The fluid transportation system includes a reservoir to hold an amount of fluid. The fluid transportation system also includes the fluid extraction system with its interface and controller. In this example, the controller allows multiple fluid delivery operations within the fluid transportation system. The multiple fluid transportation operations includes a fluid extraction operation which is triggered based on data received from a memory device of the removable extraction reservoir. In this example, the fluid extraction system also includes a valve per reservoir to, during the fluid extraction operation, establish a fluid path between the corresponding reservoir to the corresponding removable extraction reservoir. The fluid transportation system also includes a pump per reservoir to, during the fluid extraction operation, move fluid from the corresponding reservoir to the corresponding removable extraction reservoir.

The present specification also describes a method of extracting fluid from a reservoir. According to the method, a removable extraction reservoir is received at an interface of a printing device. Data is extracted from a memory device of the removable extraction reservoir. Based on the extracted data, an extraction of fluid in a reservoir to the removable extraction reservoir is initialized.

Such a fluid extraction system may 1) prevent disposal of otherwise usable fluid disposed within an out-of-contract/non-functioning printing device; 2) reduce financial exposure for fluid suppliers as they can reclaim fluid dispensed in an out-of-contract/non-functioning printing device; 3) prevent printing device failure due to ink drying out during long term storage; 4) reduce service cost and complexity; 5) prevent re-fill with unauthorized fluid; 6) allow printing device recyclability without fluid in reservoir; 7) enable extraction from a single reservoir; and 8) enable secure reclamation and refilling of ink.

As used in the present specification and in the appended claims, the term "fluid transportation operation" refers to an operation wherein fluid is transported through a system. Examples of fluid transportation operations include recirculation through a reservoir, recirculation through a printhead, refilling a reservoir, and extracting fluid from a reservoir.

Figure 2:
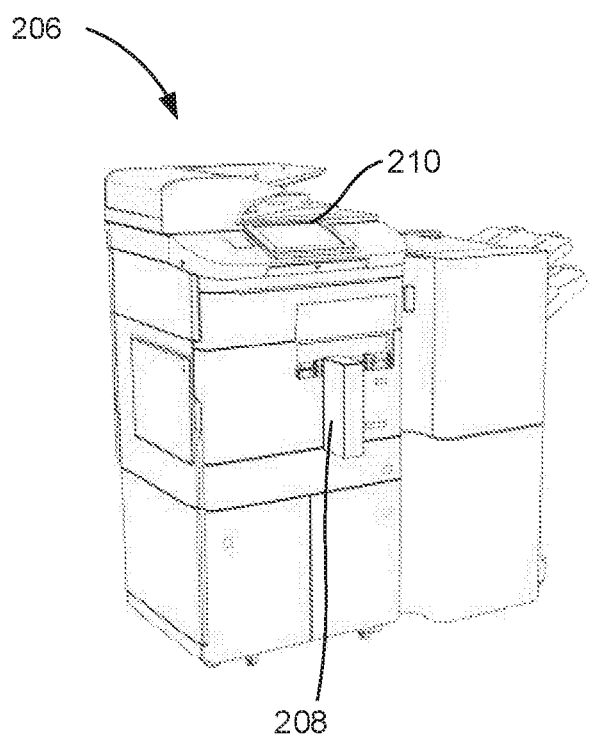
FIG. 2 is an isometric view of a printing device with a fluid extraction system for extracting fluid to a removable extraction reservoir, according to an example of the principles described herein.

Turning now to the figures, FIG. 1 is a block diagram of a fluid extraction system (100) for extracting fluid to a removable extraction reservoir, according to an example of the principles described herein. Specifically, FIG. 1 is a block diagram of a closed-loop fluid extraction system (100) which extracts fluid, such as ink, in a manner that preserves fluid integrity so that it may be used to fill the same, or different, printers in the future. The fluid extraction system (100) may be disposed in a printing device as depicted in FIG. 2. In this example, the fluid that is extracted is ink. In other examples, the fluid that is extracted may be other than ink. For example, the fluid may be a fusing agent used in an additive manufacturing operation.

The fluid extraction system (100) includes an interface (102). The interface (102) receives a removable extraction reservoir and fluidically and electrically couples the removable extraction reservoir to a printing device in which the fluid extraction system (100) is disposed. That is, the interface (102) may have a needle that pierces a septum of the removable extraction reservoir to allow fluid to flow between the removable extraction reservoir and the internal reservoir of the printing device.

The interface (102) may also have an electrical connection that mates with an electrical connection of the removable extraction reservoir. Via the mating of these two electrical connections, a data transmission path is established. The data transmission path facilitates the transmission of various pieces of data. For example, a memory device on the removable extraction reservoir may indicate a number of permissible fluid extractions to the removable extraction reservoir. As a specific example, it may be desirable to limit the number of times fluid can be extracted to the removable extraction reservoir. In such an example, the memory device of the removable extraction reservoir may have a counter, and a fluid extraction may be either permitted or prohibited based on a value of the counter that is transmitted via the electrical connections on the interface (102) (e.g., in one case, a counter may have a threshold value of 10 extractions above which further extractions may be prohibited, etc.). Doing so may prevent undesirable extractions, such as by malicious third parties. In some examples, the number may be 1 or another limited amount.

Data that may be transmitted may also include a capacity of the removable extraction reservoir. The controller (104) of the fluid extraction system (100) may terminate extraction when a quantity of fluid extracted matches the capacity of the removable extraction reservoir. Further, the data may include an amount of fluid already disposed in the removable extraction reservoir. Again, this may be used to terminate fluidic extraction when the capacity less the amount of fluid disposed in the extraction reservoir is reached. In another example, the amount of fluid disposed within the removable extraction reservoir may be used during a re-fill operation wherein fluid is passed from the extraction reservoir to an internal reservoir of the printing device. Accordingly, the refill operation may be terminated when the quantity of fluid passed to the reservoir from the extraction reservoir reaches the amount of fluid disposed in the extraction reservoir.

As yet another example, the data may indicate a type of fluid, for example a type of ink. The type of ink or the type of fluid may affect various parameters of the extraction operation such as whether extraction is permissible, an extraction rate, and/or an extraction amount. Other parameters may also be affected.

As yet another example, the data may indicate an age of the fluid disposed in the removable extraction reservoir. The age of fluid may also affect various parameters of the extraction process such as whether extraction is permissible, an extraction rate, and/or an extraction amount. Other parameters may also be affected.

In yet another example, the data may identify a type of extraction reservoir. That is, the data may distinguish a supply reservoir from an extraction reservoir, the supply reservoir being used to top off an internal reservoir, and the extraction reservoir being used to extract fluid from the internal reservoir among other operations.

While particular reference is made to a few pieces of data that are included in the memory device, that are transferred through the interface (102), and that control fluidic extraction, other pieces of data may also be transferred and used.

In some examples, the interface (102) may facilitate, in addition to reading, the writing of data. That is the memory device of the removable extraction reservoir may be re-writeable. As noted above, the extraction reservoir is to receive an amount of fluid from the reservoir in the printing device. As such, the interface (102) may facilitate the writing of data indicative of an amount of fluid extracted from the reservoir of the printing device, by way of non-limiting example.

The fluid extraction system (100) also includes a controller (104) to initiate an extraction operation. Specifically, the controller (104) receives data transmitted via the interface (102) and, based on that data, initiates the extraction operation wherein fluid from the internal reservoir of the printing device is passed to the removable extraction reservoir. As a specific example, the data received via the interface (102) may indicate that a threshold number of extractions to the removable extraction reservoir has been met such that additional extractions are impermissible. As another specific example, the data received via the interface (102) may indicate that the threshold number of extractions has not been met. Accordingly, the controller (104) may initiate the extraction.

Moreover, the data may include additional information that the controller (104) uses to control the operation of valves, pumps, etc. in regulating fluidic extraction. As yet another example, the controller (104) may use the data to determine a compatibility of a removable extraction reservoir. If the data received does not match authorized data found in the controller (104), an extraction operation may be prohibited. Such a controller (104) acting on data received from the removable extraction reservoir allows for increased control over the extraction process. That is, rather than merely inserting a tube into an internal reservoir, the present system (100) allows automated extraction to be completed just when certain criteria are met, thus preventing unauthorized, and sometimes malicious, fluidic extraction.

Moreover, the increased control provides additional confidence in the integrity of the fluid, e.g., that the fluid is from a particular manufacturer, or meets particular quality standards. The present system (100) by tracking and monitoring various aspects of the ejection operation provides a closed-loop extraction that allows for additional control and manipulation over the process.

FIG. 2 is an isometric view of a printing device (206) with a fluid extraction system (FIG. 1, 100) for extracting fluid to a removable extraction reservoir (208), according to an example of the principles described herein. In this example, the fluid extraction system (FIG. 1, 00) includes the removable extraction reservoir (208) to which the fluid is extracted. As described above, the removable extraction reservoir (208) has a corresponding interface that mates with the interface (FIG. 1, 102) of the fluid extraction system (FIG. 1, 100) such that fluid can be transferred between the printing device (206) and the removable extraction reservoir (208).

The removable extraction reservoir (208) refers to a device that holds fluid. The fluid may be any type including ink for 2D printing and/or an additive manufacturing fabrication agent. The removable extraction reservoir (208) may take many forms. For example, the removable extraction reservoir (208) may include a pliable reservoir that conforms to the contents disposed therein. Because a pliable reservoir is difficult to handle and manipulate, it may be disposed in a rigid container, for example a corrugated fiberboard carton.

The removable extraction reservoir (208) may include channels and openings to facilitate the extraction of the fluid and in some examples delivery of fluid to the printing device (206). In some examples, the opening to the removable extraction reservoir (208) may have a port or closing such that when the removable extraction reservoir (208) is not disposed in a printing device (206), the fluid therein does not leak out.

The removable extraction reservoir (208) also includes an electrical connection to establish a data transmission path between the removable extraction reservoir (208) and the printing device (206), specifically the controller (FIG. 1, 104) of the printing device (206). Many different types of data may be transmitted via this connection as described above. For example, information regarding a formulation of the ink, a capacity of the removable extraction reservoir (208), etc., may be included on a chip of the removable extraction reservoir (208). This information may be passed to the printing device (206) to verify the removable extraction reservoir (208), authenticate the removable extraction reservoir (208), or to adjust the operation of fluidic extraction in order to optimize performance. While specific reference is made to particular pieces of information, additional pieces of data can also be transferred via the electrical interface.

As described above, the interface (FIG. 1, 102) mates with an interface on the removable extraction reservoir (208). For example, the interface (FIG. 1, 102) may include a needle to be inserted into a removable extraction reservoir (208). The needle may be hollow and allow fluid to pass there through. The needle may pierce a septum on the removable extraction reservoir (208) and be put in fluidic communication with contents of the removable extraction reservoir (208). In another example, a valve or gasket may be present on the removable extraction reservoir (208) and the needle may pass through the valve or gasket.

In some examples, the interface (FIG. 1, 102) includes a retractable plate. The retractable plate has two positions, a retracted position and an extended position. The retractable plate may be in the extended position when the port is empty, that is when a removable extraction reservoir (208) is not attached. In the extended position, the retractable plate extends past the interface (FIG. 1, 102) to protect various components. That is, the needle may be a fragile component as may the circuitry that makes up the electrical connection. Accordingly, the retractable plate may extend past these components to prevent any mechanical force from damaging these components.

In a retracted position, that is when a removable extraction reservoir (208) is inserted, the retractable plate retracts to 1) expose the needle to the removable extraction reservoir (208) and 2) expose the electrical contacts to corresponding contacts on the removable extraction reservoir (208). A latch assembly of the interface (FIG. 1, 102) controls the movement of the retractable plate and is activated by keying features. For example, the keying features may be keyed slots that gate insertion to just those removable extraction reservoirs (208) with matching keying features. As a specific example, keyed slots 1) allow matching protrusions to act upon rods to actuate the retractable plate and 2) prevent non-matching protrusions from acting upon the rods.

Upon insertion, protrusions on the removable extraction reservoir (208), if they match the keyed slots, press against the retractable plate to expose the components of the interface (FIG. 1, 102) to facilitate fluid transportation.

In some examples, the protrusions on a removable extraction reservoir (208) have a size and shape that are unique to particular keyed slots of the interface (FIG. 1, 102). If the protrusions match a size and shape of associated keyed slots, the protrusions may pass through and interface with the retractable plate. The particular shape and size of the slots and protrusions may be unique to a particular type of fluid. For example, the shape and size may relate to a particular color of ink that is intended to be inserted into that particular port. Accordingly, interfaces on removable extraction reservoirs (208) to be used with particular colors would have different shaped and sized protrusions and therefore would not be able to be inserted into the port on account of not matching up with the associated keyed slots. Put another way, the keyed slots gate insertion of removable extraction reservoirs (208). That is, a printing device (206) may have ports into which removable extraction reservoirs (208) are disposed. It may be desirable that certain types of liquid be inserted into particular ports.

As a specific example, where the fluid is ink, it may be desirable that certain colors of ink are disposed in certain ports. Accordingly, via the keyed slots it may be ensured that just a desired removable extraction reservoir (208) is inserted into a particular port. A removable extraction reservoir (208) of that fluid type or color of ink may have protrusions that match the shape of the keyed slots. In this example, those similarly-shaped protrusions fit into the keyed slots and can therefore mate with the interface (FIG. 1, 102). By comparison, if a user tries to insert a removable extraction reservoir (208) for a different type or a different color ink into that port, the protrusions would not match the keyed slots and that different removable extraction reservoir (208) would not be insertable into that particular port.

In some examples, the printing device (206) may include multiple interfaces (FIG. 1, 102) with each interface (FIG. 1, 102) being uniquely keyed to a removable extraction reservoir (208) with different characteristics as described above. For simplicity of illustration, a single removable extraction reservoir (208) is depicted as being coupled to the printing device (206). However, the fluidic extraction system (FIG. 1, 100) may be able to extract fluid from multiple internal reservoirs to multiple removable extraction reservoirs (208).

In some examples, internal reservoirs corresponding to empty interfaces (FIG. 1, 102) may circulate fluid through a fluid transport system while a reservoir corresponding to a populated interface (FIG. 1, 102) is depleted. In this example, each internal reservoir may be driven by a single pump. In other examples where each internal reservoir is driven by a unique pump, pumps corresponding empty interfaces (FIG. 1, 102) may be deactivated.

In some examples, the printing device (206) includes a display (210). In addition to other operations, the display (210) may indicate a status of the fluid extraction operation. That is, the display (210) may include a real-time indication of fluid level in an internal reservoir and/or an estimate of the time remaining until full fluidic extraction.

Figure 3:
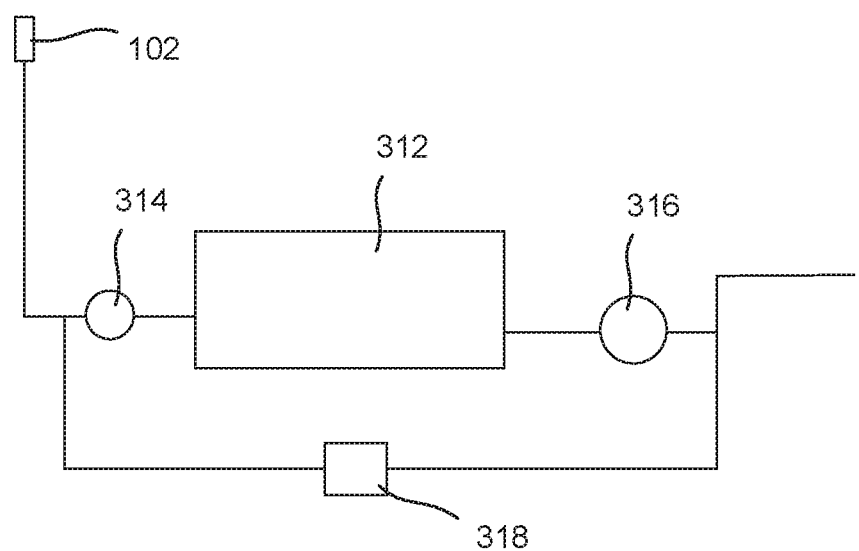
FIG. 3 is a diagram of a fluid transport system for extracting fluid to a removable extraction reservoir, according to an example of the principles described herein.

FIG. 3 is a diagram of a fluid transport system for extracting fluid to a removable extraction reservoir (FIG. 2, 208), according to an example of the principles described herein. The fluid transport system includes a reservoir (312). As described above, the reservoir (312) may be internal to a printing device (FIG. 2, 206) and may hold different types of fluid. For example, the reservoir (312) may hold an ink used in 2D printing. In another example, the reservoir (312) holds a fusing agent in a 3D printing process. In some examples, a printing device (FIG. 2, 206) may have multiple reservoirs (312). Accordingly, each reservoir (312) may correspond to a different fluid transport system.

The fluid transport system also includes an interface (102) as described above to receive a removable extraction reservoir (FIG. 2, 208). The interface (102) may include components such as a needle to be inserted into the removable extraction reservoir (FIG. 2, 208) to facilitate fluid transport and electrical connections to facilitate data transmission. Also as described above, in some examples, the interface (102) includes keying features to gate insertion of a particular type of removable fluid reservoir (FIG. 2, 208).

The fluid transport system also includes the controller (104) described earlier. In other words, the fluid transport system may include the fluid extraction system (FIG. 1, 100) with its components, e.g., the interface (102) and the controller (104).

The controller (104) may control various components during fluid transportation. Specifically, the controller (104) may control a valve (318) and pumps (314, 316). Each reservoir (312) may have a valve (318) that, during fluid extraction, establishes a fluid path between the reservoir (312) and a removable extraction reservoir (FIG. 2, 208) coupled to the interface (102). For example when the valve (318) is opened fluid may pass to either the reservoir (312) in a recirculation operation or to the interface (102) via an extraction operation.

The fluid transport system also includes pumps (314, 316). While FIG. 3 depicts multiple pumps (314, 316), in some examples a single pump (314, 316) may be used. During fluid extraction, fluid is moved to or from the reservoir (312), removable extraction reservoir (FIG. 2, 208) and other components via the pumps (314, 316).

The pumps (314, 316) and valve (318) each may have different states. For example, a pump (314, 316) may be active meaning it works to move fluid, or it may be idle, meaning that it does not work to move fluid. The valve (318) may be open meaning fluid may pass therethrough, or it may be closed meaning fluid does not pass therethrough. Based on a combination of states of these different components different fluid transport operations may be carried out. Put another way, the controller (104) by controlling the state of the various pumps (314, 316) and the valve (318) may allow different fluid transport operations, including a fluid extraction operation. Other examples of operations that can be carried out include a reservoir (312) fill operation, a reservoir (312) fluid recirculation operation, a printhead fluid recirculation operation, or combinations thereof. Diagrammatic examples of multiple fluidic transport operations are provided below in connection with FIGS. 5A-5E.

Accordingly, via the operations of the controller (104) and the various pumps (314, 316) and the valve (318) any number of fluidic transport operations can be carried out all while giving an operator confidence in the integrity and security of the fluid and the operation itself.

Figure 4:
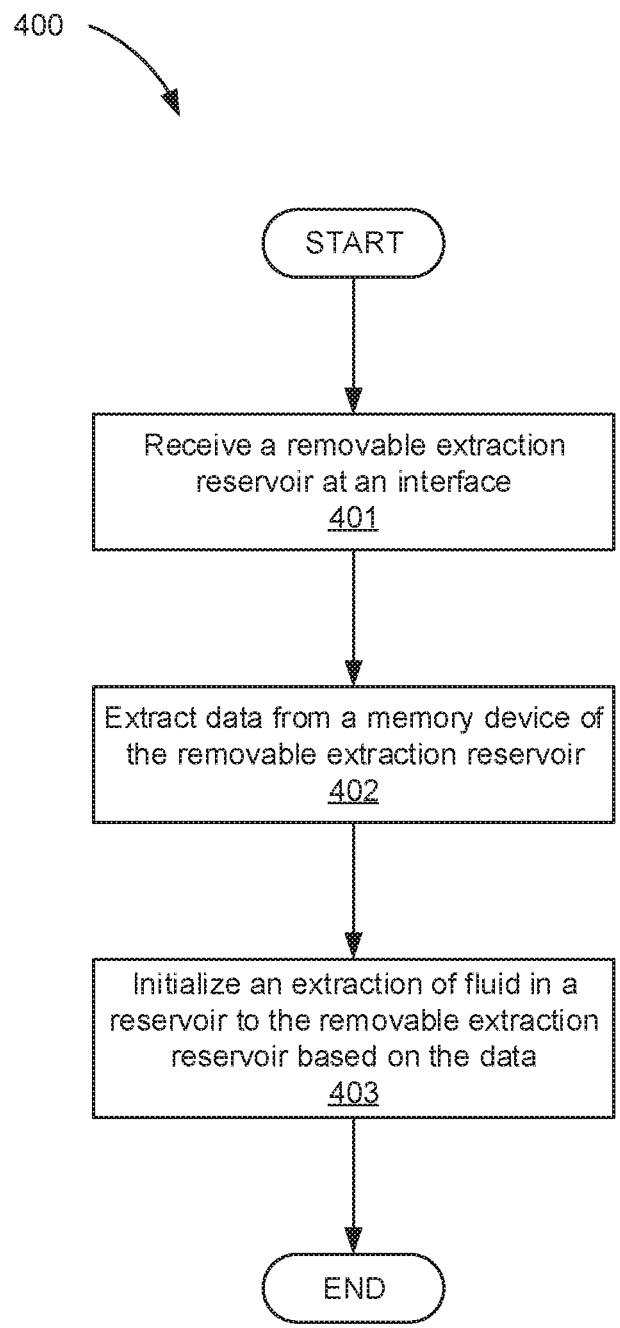
FIG. 4 is a flow chart of a method for extracting fluid to a removable extraction reservoir, according to an example of the principles described herein.

FIG. 4 is a flow chart of a method (400) for extracting fluid to a removable extraction reservoir (FIG. 2, 208), according to an example of the principles described herein. According to the method (400) a removable extraction reservoir (FIG. 2, 208) is received (block 401) at an interface (FIG. 1, 102). As described above, the interface (FIG. 1, 102) is a component of a fluid ejection system (FIG. 1, 100) that provides a mechanical, electrical, and fluidic connection between an inserted removable extraction reservoir (FIG. 2, 208) and a reservoir (FIG. 3, 312) of a printing device (FIG. 2, 206). That is, the interface (FIG. 1, 102) may mechanically retain the removable extraction reservoir (FIG. 2, 208) to the printing device (FIG. 2, 206) in which the fluidic extraction system (FIG. 1, 100) is disposed, via the latch assembly for example. The interface (FIG. 1, 102) also includes electrical connections that mate with corresponding connections on the removable extraction reservoir (FIG. 2, 208) such that a data transmission path is established. Via this data transmission path control information for the extraction operation can be received from the memory device on the removable extraction reservoir (FIG. 2, 208). The interface (FIG. 1, 102) also includes a needle or other component that pierces a septum or is otherwise inserted into the removable extraction reservoir (FIG. 2, 208). Through such a needle fluid can be deposited into the removable extraction reservoir (FIG. 2, 208) or drawn from the removable extraction reservoir (FIG. 2, 208).

In some examples, receiving (block 401) the removable extraction reservoir (FIG. 2, 208) comprises gating insertion of a removable extraction reservoir (FIG. 2, 208) to one of a particular type. That is, via keying features on the interface (FIG. 1, 102) and corresponding keying features on the removable extraction reservoir (FIG. 2, 208), mating of these two components can be restricted to just those components with corresponding, or mating interfaces.

Once inserted, data can be extracted (block 402) from a memory device of the removable extraction reservoir (FIG. 2, 208). That is, the removable extraction reservoir (FIG. 2, 208) may include an acumen chip or other hardware that stores information and can either be read or written to. The data stored thereon can control the operation of the fluidic extraction. Specifically, the data could prohibit or enable data extraction. Moreover, the data could dictate how the parameters of the data fluid transport system are set. As yet a further example, the data could include identifying information of either the fluid disposed in the extraction reservoir (FIG. 2, 208) or of the extraction reservoir (FIG. 2, 208) itself. Such identification information could be used for authentication and or verification of the extraction operation.

Based on the extracted data, an extraction operation is initialized (block 403). That is, based on activation data, parameter data, and/or identification data, the controller (FIG. 1, 104) may set the pumps (FIG. 3, 314, 316) and/or valve (FIG. 3, 318) to various states to execute a particular fluid transport operation. As described above, FIGS. 5A-5E depict various fluid transport operations and the states of the pumps (FIG. 3, 314, 316) and valve (FIG. 3, 318) as controlled by the controller (FIG. 1, 104) to carry out those fluid transport operations. Such a method (400) thereby allows for the controlled and secure transportation of fluid within a printing device (FIG. 2, 206), to a printing device (FIG. 2, 206), or from a printing device (FIG. 2, 206).

Figure 5A:
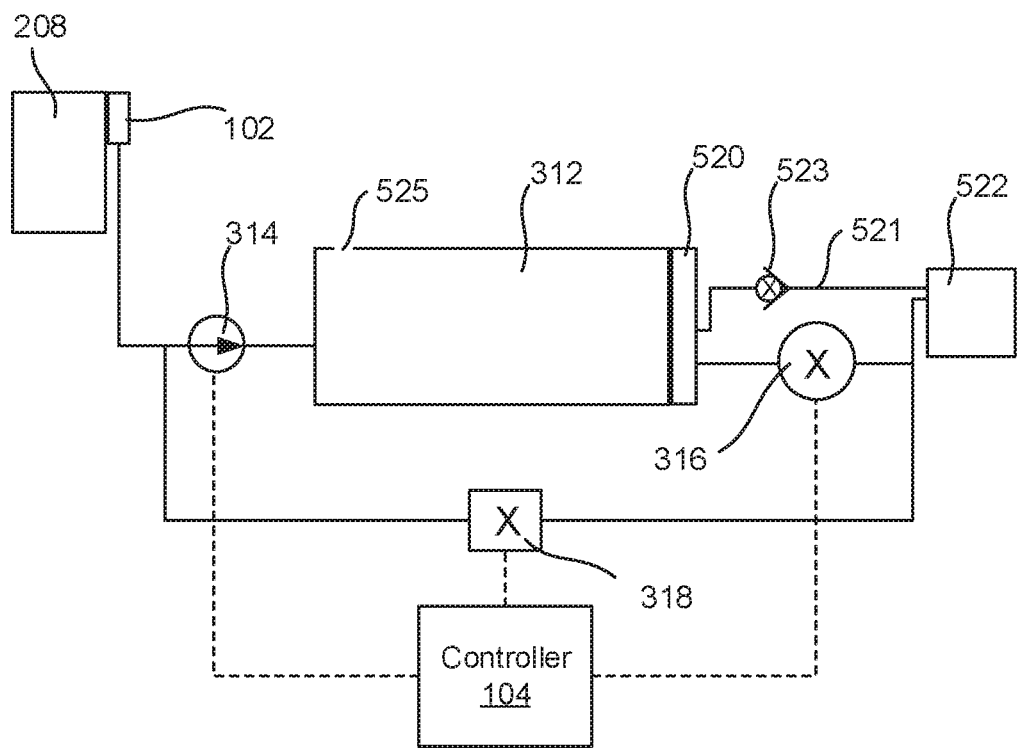
FIGS. 5A-5E are diagrams of various fluid transport operations, according to an example of the principles described herein.

FIGS. 5A-5E are diagrams of various fluid transport operations, according to an example of the principles described herein. In FIGS. 5A-5E the→symbol→in a pump (314, 316) indicates the pump (314, 316) is actively moving fluid whereas the symbol "X" for a pump (314, 316) indicates the pump (314, 316) is idle and not moving fluid. In FIG. 5A the symbol→in the valve (318) indicates the valve (318) is open such that fluid may pass whereas the symbol "X" for a valve (318) indicates the valve (318) is inactive and fluid may not pass. In FIGS. 5A-5E the symbol "X" for a pressure control device (523) indicates the fluid is not flowing through the return line (521)→By comparison, the symbol→indicates a fluid flow through the return line (521) when active. FIGS. 5A-5E also depict a fluid level sensor (520) and a vent (525). The fluid level sensor (520) is disposed on, or in, the reservoir (312) and defines when to terminate a fluid delivery operation. That is, the fluid level sensor (520) may indicate when the reservoir (312) is full such that a reservoir (312) fill operation may be terminated. In another example, the fluid level sensor (520) may indicate when the reservoir (312) is empty such that a fluid extraction operation may be terminated. In some examples, the reservoir (312) includes at least one vent (525), and may include more. During printing, the vent (525) allows air to enter to prevent the formation of a vacuum. The vent (525) also allows air to exit during refill to prevent over-pressuring the reservoir (312). The vents (525) may also be used to allow pressure relief when the reservoir (312) has been over-pressured.

FIGS. 5A-5E also depict the printhead (522) from which fluid is ejected. That is, the printhead (522) may include various ejecting components that include chambers where a small amount of fluid is held. The controller (104) or another controller then activates at particular times to eject fluid from the chambers through an opening in a desired pattern. In this fashion, fluid is deposited on a substrate in a desired pattern in 2D printing, 3D printing, or another ejection operation. FIGS. 5A-5E also depict a return line (521) and a pressure control device (523).

FIG. 5A depicts a reservoir (312) fill operation wherein fluid is passed from the removable extraction reservoir (208) to the internal reservoir (312). To effectuate a fluid refill operation, the controller (104) deactivates a pump (316) downstream of the reservoir (312) such that fluid does not flow out of the reservoir (312). The controller (104) also closes the valve (318) and activates a pump (314) upstream of between the removable extraction reservoir (208) and the internal reservoir (312) (e.g., upstream from the reservoir (312)) such that fluid is drawn from the removable extraction reservoir (208) to the reservoir (312). Such an operation may be controlled, in part, via data extracted from the removable extraction reservoir (208). In this example, as no fluid is flowing to or from the printhead (522), the return line (521) and pressure control device (523) are inactive.

Figure 5B:
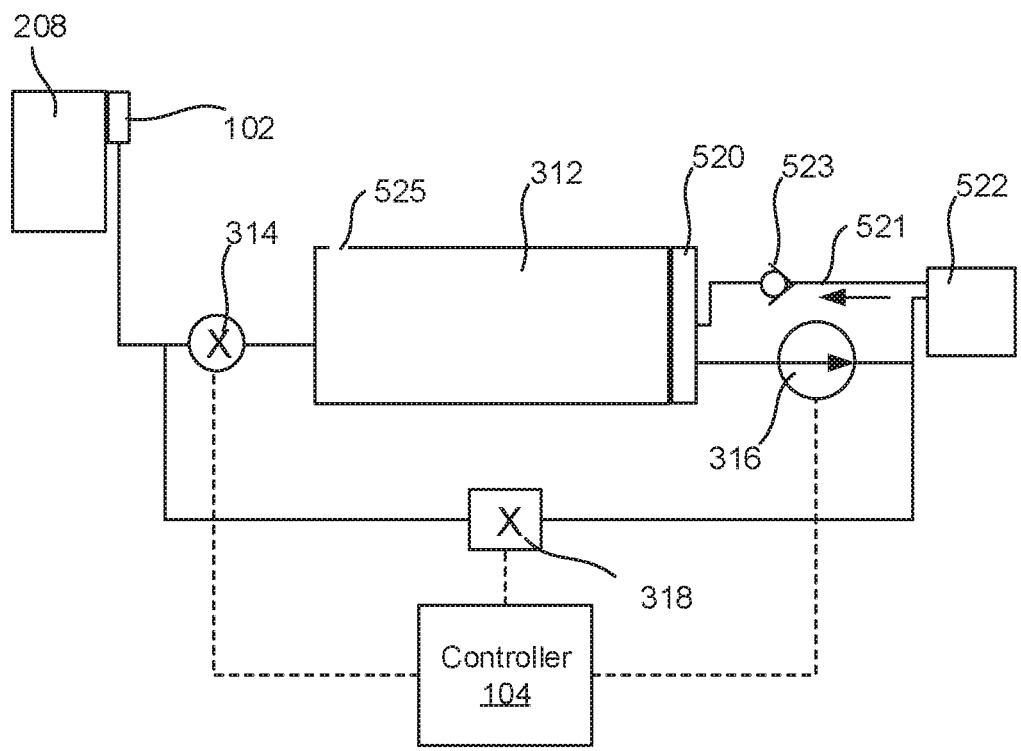

FIG. 5B depicts a printhead (522) fluid recirculation operation wherein fluid is passed from the reservoir (312) in the printing device (FIG. 2, 206) to the printhead (522). That is, in some examples it may be desirable to circulate fluid between the printhead (522) and the reservoir (312). Doing so ensures that fresh fluid is available to the printhead (522). The use of fresh fluid in the printhead (522) may enhance quality as fresh fluid, such as ink, has characteristics that lead to enhanced printing. To effectuate a printhead (522) fluid recirculation operation, the controller (104) activates a pump (316) downstream of the reservoir (312) such that fluid may pass. The return line (521) and pressure control device (523) are also activated to ensure that fluid is pushed through to the printhead (522) and not sucked out of the printhead (522). The controller (104) also closes the valve (318) so as to not draw fluid away from the printhead (522). The controller (104) also deactivates the pump (314) upstream of the internal reservoir (312). Such an operation may be controlled, in part, via data extracted from the removable extraction reservoir (208).

Figure 5C:
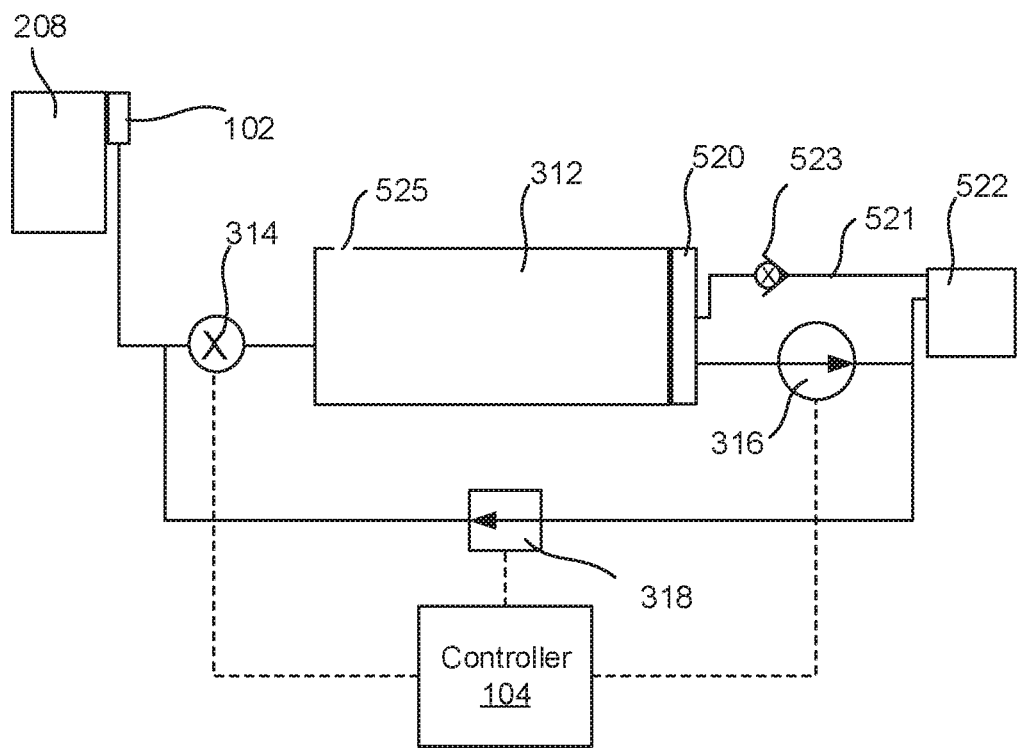

FIG. 5C depicts a fluid extraction operation wherein fluid is passed from the reservoir (312) in the printing device (FIG. 2, 206) to the removable extraction reservoir (208). As described above, there are a number of reasons why it would be desirable to extract fluid from a reservoir (312). To effectuate a fluid extraction operation, the controller (104) activates a pump (316) downstream of the reservoir (312) such that fluid may pass. The controller (104) also opens the valve (318) so as allow fluid to pass towards the removable extraction reservoir (208). The controller (104) also deactivates the pump (314) upstream of the internal reservoir (312) so as to not draw the fluid back to the reservoir (312). In this example, the return line (521) and pressure control device (523) are deactivated so as to not draw fluid from the printhead (522), thus refilling the removable extraction reservoir (208). Such an operation may be controlled, in part, via data extracted from the removable extraction reservoir (208).

Figure 5D:
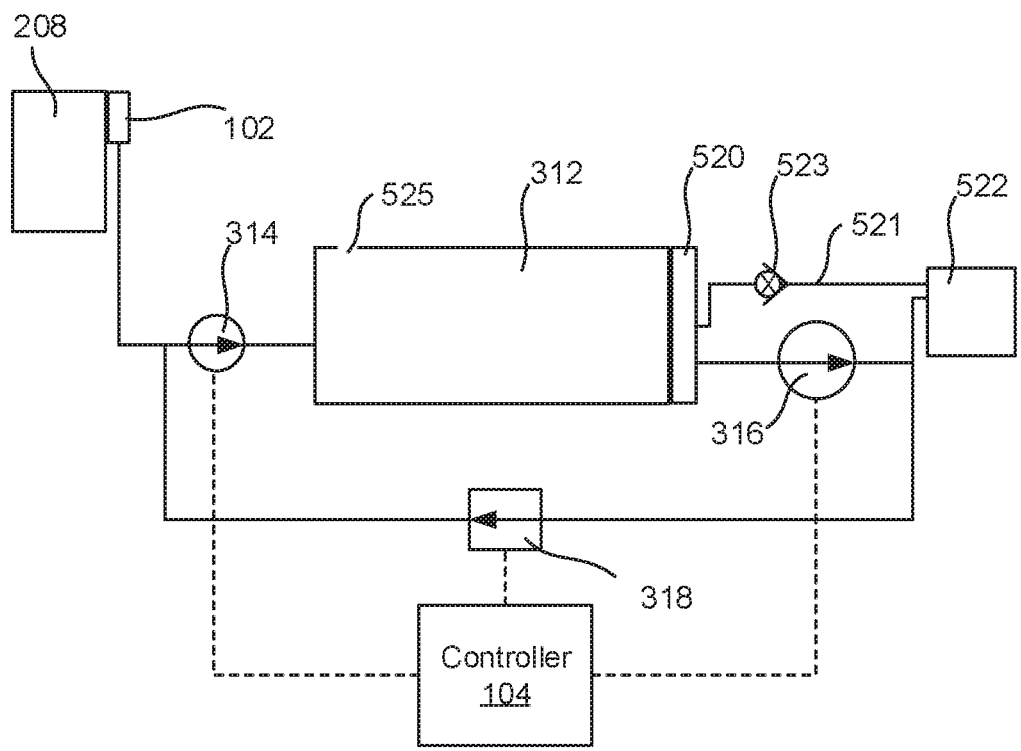

FIG. 5D depicts a reservoir (312) fluid recirculation operation wherein fluid is recirculated through the reservoir (312). That is, in some examples it may be desirable to circulate fluid through the reservoir (312), for example to prevent pigment settling at the bottom of the reservoir (312), which settling can lead to print defects and blockage. To effectuate a reservoir (312) fluid recirculation operation, the controller (104) activates a pump (316) downstream of the reservoir (312) such that fluid may pass. The controller (104) also opens the valve (318) to let fluid pass. The controller (104) also activates the pump (314) upstream of the internal reservoir (312). In this example, the pressure control device (521) and the return line (523) may be active to recirculate fluid between the printhead (522) and the reservoir (312). Such an operation may be controlled, in part, via data extracted from the removable extraction reservoir (208).

Figure 5E:
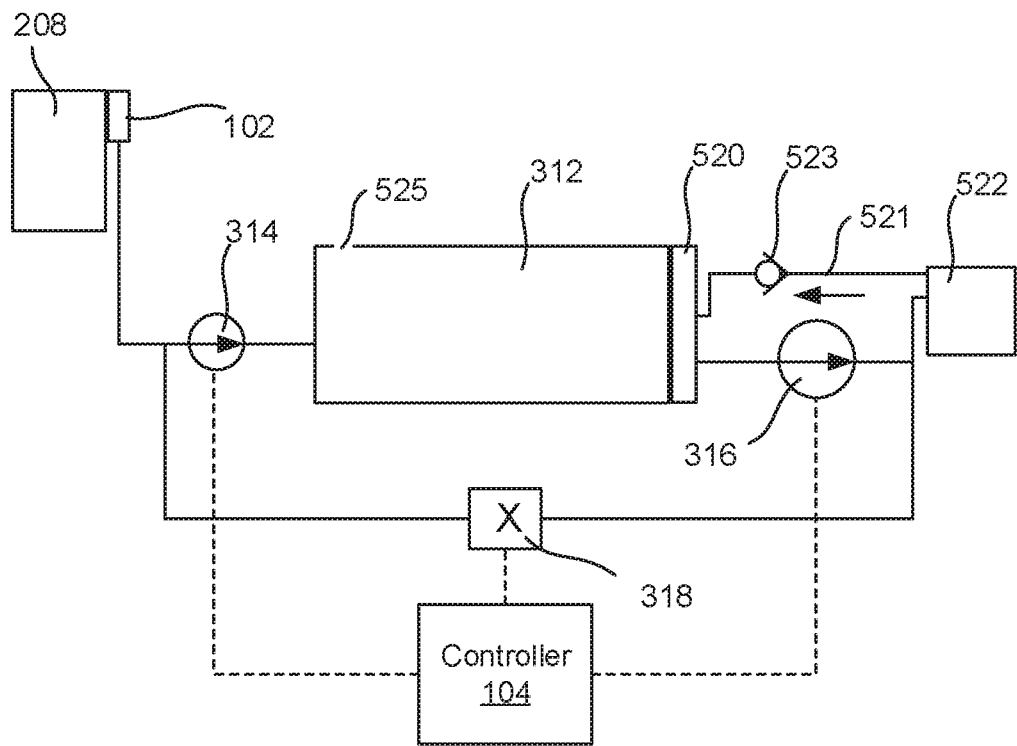

FIG. 5E depicts an operation wherein fluid is refilled from the removable extraction reservoir (208) to the reservoir (312) while the fluid is passed from the reservoir (312) to the printhead (522). That is, refilling from the removable extraction reservoir (208) may occur during printing. Such a refilling without printing interruption enhances performance as a user does not have to interrupt a printing operation to refill the fluid. To effectuate a reservoir (312) refill operation during printing, the controller (104) activates a pump (316) downstream of the reservoir (312) such that fluid may pass. The controller (104) also closes the valve (318) so as to not draw fluid towards the removable extraction reservoir (208). The controller (104) also activates the pump (314) upstream of the internal reservoir (312) so as to draw the fluid from the removable extraction reservoir (208) to the reservoir (312). In this example, as fluid is flowing to or from the printhead (522), the return line (521) and pressure control device (523) are active. Such an operation may be controlled, in part, via data extracted from the removable extraction reservoir (208).

Figure 6:
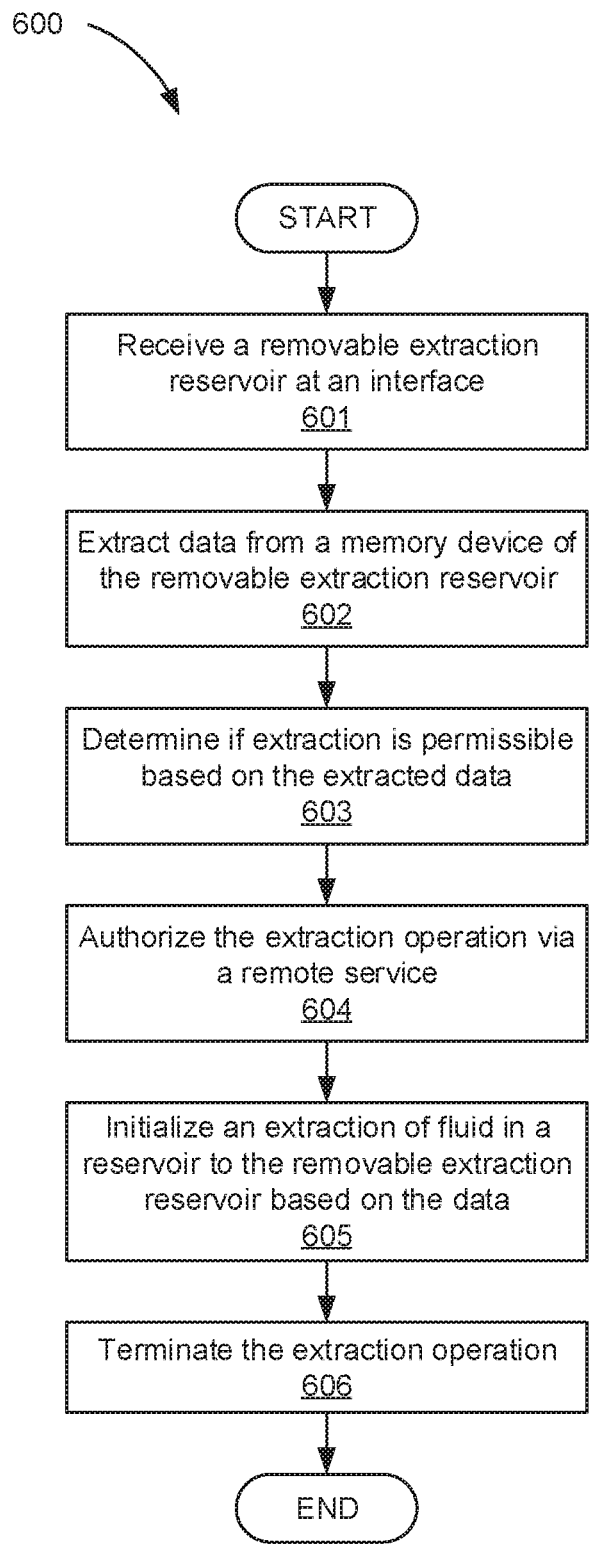
FIG. 6 is a flow chart of a method for extracting fluid to a removable extraction reservoir, according to an example of the principles described herein.

FIG. 6 is a flow chart of a method (600) for extracting fluid to a removable extraction reservoir (FIG. 2, 208), according to an example of the principles described herein. According to the method (600) a removable extraction reservoir (FIG. 2, 208) is received (block 601) at an interface (FIG. 1, 102) and data extracted (block 602) therefrom. In some examples, this may be performed as described above in connection with FIG. 4.

In some examples, the method (600) includes determining (block 603) if extraction to the removable extraction reservoir (FIG. 2, 208) is permissible based on the extracted data. For example, in some cases a threshold number of fluid extractions to the removable extraction reservoir (FIG. 2, 208) may have been met, the removable extraction reservoir (FIG. 2, 208) or the contents thereof may not be authorized, and/or any number of other circumstances may prohibit fluidic extraction.

If fluidic extraction is permissible (block 603), the extraction operation may be authorized (block 604) via a remote service for example. That is, the printing device (FIG. 2, 206) may be coupled to an internet and may send a request to a web server to initialize a fluidic extraction. The request may be processed by any number of methods including administrator authorization. Doing so adds yet another degree of security and further enhances confidence in the integrity of the fluid and the fluid extraction operation.

The extraction operation can then be initialized (block 605) as described above in connection with FIG. 4. The extraction operation can be terminated (block 606) based on any number of operations. For example, a fluid level sensor (FIG. 5, 520) in or near the reservoir (312) may indicate that the reservoir (FIG. 3, 312) is empty. This may trigger termination (block 606) of the extraction operation. In another example, an indication that the removable extraction reservoir (FIG. 2, 208) is full may trigger termination (block 606) of the extraction operation. Indication that the removable extraction reservoir (FIG. 2, 208) is full may be by comparing a capacity of the removable extraction reservoir (FIG. 2, 208) as determined by the data on the removable extraction reservoir (FIG. 2, 208) against flow data from the fluid extraction system (FIG. 1, 100). In another example, the removable extraction reservoir (FIG. 2, 208) itself may have a level sensor to indicate when the removable extraction reservoir (FIG. 2, 208) is full. The method (600) as described herein adds even more security and confidence to the extraction operation.

Such a fluid extraction system may 1) prevent disposal of otherwise usable fluid disposed within an out-of-contract/non-functioning printing device; 2) reduce financial exposure for fluid suppliers as they can reclaim fluid dispensed in an out-of-contract/non-functioning printing device; 3) prevent printing device failure due to ink drying out during long term storage; 4) reduce service cost and complexity; 5) prevent re-fill with unauthorized fluid; 6) allow printing device recyclability without fluid in reservoir; 7) enable extraction from a single reservoir; and 8) enable secure reclamation and refilling of ink.

What is claimed is:

1. A fluid extraction system in a printing device comprising:
    an interface configured to fluidically and electrically couple an external removable fluid extraction reservoir to the printing device, wherein the external removable fluid extraction reservoir has a memory to store data;
    an internal fluid reservoir;
    a controller configured to receive the data from the memory and based on the data received from memory of the external removable fluid extraction reservoir, initiate a fluid extraction operation, wherein fluid from the internal fluid reservoir in the printing device is passed to the external removable fluid extraction reservoir; and
    a fluid level sensor disposed in the internal fluid reservoir to define when to terminate the fluid extraction operation.

2. The fluid extraction system of claim 1, further comprising the external removable fluid extraction reservoir.

3. The fluid extraction system of claim 1, further comprising:
    a valve configured to, during the fluid extraction operation, establish a fluid path between the internal fluid reservoir to the external removable fluid extraction reservoir; and
    a first pump configured to, during the fluid extraction operation, move fluid from the internal fluid reservoir to the external removable fluid extraction reservoir.

4. The fluid extraction system of claim 3, wherein:
    the fluid extraction system is configured to:
        pass a fluid from the external removable fluid extraction reservoir, with the fluid disposed therein, to the internal fluid reservoir in the printing device while the first pump downstream of the internal fluid reservoir is idle, the valve is closed, and a second pump upstream of the internal fluid reservoir of the printing device is active;
        pass the fluid from the internal fluid reservoir in the printing device to a printhead in the printing device while the first pump downstream of the internal fluid reservoir is active, the valve is closed, and the second pump upstream of the internal fluid reservoir of the printing device is idle;
        circulate the fluid through the internal fluid reservoir in the printing device while the first pump downstream of the internal fluid reservoir is active, the valve is open, and the second pump upstream of the internal fluid reservoir of the printing device is active;
        pass the fluid from the internal fluid reservoir in the printing device to the external removable fluid extraction reservoir while the first pump downstream of the internal fluid reservoir is active, the valve is open, and the second pump upstream of the internal fluid reservoir of the printing device is idle; and
        pass the fluid from the internal fluid reservoir in the printing device to the printhead and from the external removable fluid extraction reservoir to the internal fluid reservoir while the first pump downstream of the internal fluid reservoir is active, the valve is closed, and the second pump upstream of the internal fluid reservoir of the printing device is active.

5. The fluid extraction system of claim 1, wherein the data is to indicate:
    a number of permissible fluid extractions to the external removable fluid extraction reservoir;
    a capacity of the external removable fluid extraction reservoir;
    a fluid age of a fluid disposed in the external removable fluid extraction reservoir;
    an amount of fluid disposed in the external removable fluid extraction reservoir;

a fluid type;
an external removable fluid extraction reservoir type; or
a combination thereof.

6. The fluid extraction system of claim 1, wherein:
the memory of the external removable fluid extraction reservoir includes a counter;
the counter indicates a number of fluid extractions to the external removable fluid extraction reservoir; and
fluid extraction from the internal fluid reservoir to the external removable fluid extraction reservoir is permissible based on a value of the counter, wherein the value of the counter corresponds to the number of fluid extractions to the external removable fluid extraction reservoir.

7. The fluid extraction system of claim 1, further comprising a different fluid level sensor disposed in the external removable fluid extraction reservoir.

8. The fluid extraction system of claim 7, wherein:
the data received from the memory further includes a capacity of the external removable fluid extraction reservoir determined via the different fluid level sensor; and
the controller is configured to determine the capacity of the external removable fluid extraction reservoir based on the data received from the memory.

9. The fluid extraction system of claim 1, wherein:
the controller is configured to determine whether the external removable fluid extraction reservoir is full by comparing a capacity of the external removable fluid extraction reservoir against flow data from the fluid extraction system; and
the capacity of the external removable fluid extraction reservoir is included in the data received from the memory.

10. A fluid transport system comprising:
a one internal fluid reservoir configured to hold an amount of fluid; and
a fluid extraction system per internal fluid reservoir, each fluid extraction system comprising:
an interface configured to fluidically and electrically couple an external removable fluid extraction reservoir to a corresponding internal fluid reservoir;
a controller configured to allow multiple fluid transport operations within a printing device, the multiple fluid transport operations including a fluid extraction operation which is triggered based on data received from a memory device of the external removable fluid extraction reservoir;
a valve configured to, during the fluid extraction operation, establish a fluid path between the corresponding internal fluid reservoir and the corresponding external removable fluid extraction reservoir;
a one pump configured to, during the fluid extraction operation, move fluid from the corresponding internal fluid reservoir to the corresponding external removable fluid extraction reservoir; and
a fluid level sensor disposed in the corresponding internal fluid reservoir to define when to terminate the fluid extraction operation.

11. The fluid transport system of claim 10, wherein the multiple fluid transport operations further comprise:
an internal fluid reservoir fill operation;
an internal fluid reservoir fluid recirculation operation;
a printhead fluid recirculation operation; or
a combination thereof.

12. The fluid transport system of claim 10, wherein:
the fluid transport system comprises additional internal fluid reservoirs; and
internal fluid reservoirs corresponding to empty interfaces are configured to circulate fluid while an internal fluid reservoir corresponding to a populated interface is depleted.

13. The fluid transport system of claim 10, further comprising a display configured to indicate a status of the fluid extraction operation.

14. The fluid transport system of claim 10, wherein each interface further comprises a keying feature configured to gate insertion to just those external removable fluid extraction reservoirs with matching keying features.

* * * * *